United States Patent
Hosking et al.

(10) Patent No.: US 7,149,430 B2
(45) Date of Patent: Dec. 12, 2006

(54) OPTOELECTRONIC TRANSCEIVER HAVING DUAL ACCESS TO ONBOARD DIAGNOSTICS

(75) Inventors: Lucy G. Hosking, Santa Cruz, CA (US); James Stewart, San Jose, CA (US); Anthony Ho, Sunnyvale, CA (US)

(73) Assignee: Finsiar Corporation, Sunnyvale, CA (US)

( * ) Notice: Subject to any disclaimer, the term of this patent is extended or adjusted under 35 U.S.C. 154(b) by 128 days.

(21) Appl. No.: 10/616,362

(22) Filed: Jul. 8, 2003

(65) Prior Publication Data

US 2004/0022543 A1 Feb. 5, 2004

Related U.S. Application Data

(63) Continuation-in-part of application No. 09/777,917, filed on Feb. 5, 2001.

(51) Int. Cl.
*H04B 10/00* (2006.01)
(52) U.S. Cl. ...................... 398/137; 398/195
(58) Field of Classification Search ................ 398/195, 398/196, 197, 198, 135–139
See application file for complete search history.

(56) References Cited

U.S. PATENT DOCUMENTS

| | | | |
|---|---|---|---|
| 4,545,078 A | 10/1985 | Wiedeburg | 398/166 |
| 4,687,924 A | 8/1987 | Galvin et al. | 250/216 |
| 4,734,914 A | 3/1988 | Yoshikawa | 372/33 |
| 4,747,091 A | 5/1988 | Doi | 369/116 |
| 4,809,286 A * | 2/1989 | Kollanyi et al. | 372/38.07 |
| 4,878,225 A | 10/1989 | Aiba | 372/29.015 |
| 4,890,288 A | 12/1989 | Inuyama et al. | 372/31 |
| 4,903,273 A | 2/1990 | Bathe | 372/29.015 |
| 4,916,707 A | 4/1990 | Rosenkranz | 372/38.09 |
| 4,918,681 A | 4/1990 | Ikeda | 369/116 |
| 4,932,038 A | 6/1990 | Windus | 375/4 |
| 5,019,769 A | 5/1991 | Levinson | 372/31 |
| 5,039,194 A | 8/1991 | Block et al. | 385/88 |
| 5,057,932 A | 10/1991 | Lang | 386/101 |
| 5,268,949 A | 12/1993 | Watanabe et al. | 377/33 |
| 5,334,826 A | 8/1994 | Sato et al. | 235/462.06 |
| 5,383,208 A | 1/1995 | Queniat et al. | 372/29.014 |
| 5,392,273 A | 2/1995 | Masaki et al. | 369/106 |
| 5,396,059 A | 3/1995 | Yeates | 250/214 C |
| 5,448,629 A | 9/1995 | Bosch et al. | 398/191 |

(Continued)

FOREIGN PATENT DOCUMENTS

EP 02704344 10/2004

(Continued)

OTHER PUBLICATIONS

N. R. Avella "AN/ARC-144 UHF Multimode Transceiver", SIGNAL, vol. 26, No. 5, (Jan/Feb 19772) pp. 14-15.

(Continued)

*Primary Examiner*—Christina Y. Leung
(74) *Attorney, Agent, or Firm*—Morgan, Lewis & Bockius LLP

(57) ABSTRACT

The optoelectronic transceiver includes first and second controller ICs. Each controller IC includes logic, a memory, an interface, and at least one input port. Each memory is configured to store digital diagnostic data and has a unique serial device address to allow a host access to each of these controller ICs separately and independently. At least some of the digital diagnostic data is common to both the first controller IC and the second controller IC. The inclusion of two controller ICs allows the same diagnostic data to be stored in completely different memory mapped locations. This allows hosts that are preconfigured differently to read different memory mapped locations on the different controller ICs to obtain the same diagnostic data.

19 Claims, 5 Drawing Sheets

U.S. PATENT DOCUMENTS

| | | | |
|---|---|---|---|
| 5,510,924 A | 4/1996 | Terui et al. | 398/107 |
| 5,515,361 A | 5/1996 | Li et al. | 370/222 |
| 5,557,437 A | 9/1996 | Sakai et al. | 398/9 |
| 5,574,435 A | 11/1996 | Mochizuki | 340/630 |
| 5,576,877 A | 11/1996 | Aulet et al. | 359/189 |
| 5,594,748 A | 1/1997 | Jabr | 372/38.09 |
| 5,604,758 A | 2/1997 | AuYeung et al. | 372/34 |
| 5,673,282 A | 9/1997 | Wurst | 372/38.09 |
| 5,748,672 A | 5/1998 | Smith et al. | 375/226 |
| 5,761,216 A | 6/1998 | Sotome et al. | 371/27 |
| 5,801,866 A * | 9/1998 | Chan et al. | 398/129 |
| 5,812,572 A | 9/1998 | King et al. | 372/38.04 |
| 5,822,099 A | 10/1998 | Takamatsu | 398/162 |
| 5,854,704 A | 12/1998 | Grandpierre | 359/189 |
| 5,926,303 A * | 7/1999 | Giebel et al. | 398/117 |
| 5,943,152 A | 8/1999 | Mizrahi et al. | 398/196 |
| 5,953,690 A | 9/1999 | Lemon et al. | 702/191 |
| 5,956,168 A | 9/1999 | Levinson et al. | 398/41 |
| 6,010,538 A | 1/2000 | Sun et al. | 156/345.13 |
| 6,014,241 A | 1/2000 | Winer et al. | 359/189 |
| 6,020,593 A | 2/2000 | Chow et al. | 250/551 |
| 6,021,947 A | 2/2000 | Swartz | 235/472.01 |
| 6,023,147 A | 2/2000 | Cargin, Jr. et al. | 320/114 |
| 6,049,413 A | 4/2000 | Taylor et al. | 359/337 |
| 6,064,501 A | 5/2000 | Roberts et al. | 398/11 |
| 6,115,113 A | 9/2000 | Flockencier | 356/5.01 |
| H1881 H | 10/2000 | David et al. | 370/458 |
| 6,160,647 A | 12/2000 | Gilliland et al. | 398/15 |
| 6,175,434 B1 | 1/2001 | Feng | 398/128 |
| 6,205,505 B1 * | 3/2001 | Jau et al. | 710/315 |
| 6,222,660 B1 * | 4/2001 | Traa | 398/213 |
| 6,256,127 B1 | 7/2001 | Taylor | 359/124 |
| 6,423,963 B1 | 7/2002 | Wu | 250/227.14 |
| 6,473,224 B1 | 10/2002 | Dugan et al. | 359/341.44 |
| 6,512,617 B1 | 1/2003 | Tanji et al. | 398/137 |
| 6,526,076 B1 | 2/2003 | Cham et al. | 372/29.011 |
| 6,631,146 B1 | 10/2003 | Pontis et al. | 372/20 |
| 6,661,836 B1 | 12/2003 | Dalal et al. | 375/226 |
| 6,694,462 B1 | 2/2004 | Reiss et al. | 714/724 |
| 6,748,181 B1 | 6/2004 | Miki et al. | 398/195 |
| 6,937,949 B1 | 8/2005 | Fishman et al. | 702/69 |
| 2002/0021468 A1 | 2/2002 | Kato et al. | 359/152 |
| 2002/0027688 A1 | 3/2002 | Stephenson | 398/139 |
| 2002/0060824 A1 | 5/2002 | Liou et al. | 359/152 |
| 2002/0097468 A1 | 7/2002 | Mecherle et al. | 398/128 |
| 2002/0101641 A1 | 8/2002 | Kurchuk | 359/189 |
| 2002/0105982 A1 | 8/2002 | Chin et al. | 372/38.02 |
| 2002/0181519 A1 | 12/2002 | Vilhelmesson et al. | 372/32 |
| 2002/0181894 A1 | 12/2002 | Gilliland et al. | 385/88 |
| 2003/0053170 A1 | 3/2003 | Levinson et al. | 398/139 |
| 2003/0113118 A1 | 6/2003 | Bartur | 398/139 |
| 2003/0269790 | 9/2003 | Chieng et al. | 372/34 |
| 2004/0076113 A1 | 4/2004 | Aronson et al. | 370/217 |
| 2004/0120720 A1 | 6/2004 | Chang et al. | 398/139 |
| 2004/0122607 A1 | 6/2004 | Fishman et al. | 702/69 |
| 2004/0153913 A1 | 8/2004 | Fishman et al. | 714/724 |
| 2004/0202210 A1 * | 10/2004 | Thornton | 372/34 |
| 2004/0240886 A1 | 12/2004 | Aronson et al. | 398/135 |
| 2004/0253003 A1 | 12/2004 | Farmer et al. | 398/214 |
| 2005/0058455 A1 | 3/2005 | Aronson et al. | 398/135 |

FOREIGN PATENT DOCUMENTS

| | | | |
|---|---|---|---|
| EP | 1471671 A2 | 12/2004 | |
| JP | 58140175 | 8/1983 | |
| JP | 62124576 | 6/1987 | |
| JP | 62235975 | 10/1987 | |
| JP | 62281485 | 12/1987 | |
| JP | 402102589 A | 4/1990 | |
| JP | 404023373 A | 1/1992 | |
| JP | 06504405 T2 | 5/1994 | |
| JP | 06209209 A | 7/1994 | |
| JP | 09162811 A | 6/1997 | |
| WO | WO 93/21706 | 10/1993 | |
| WO | WO 98/00893 | 1/1998 | |
| WO | WO 98/00943 | 1/1998 | |
| WO | PCT/US02/03226 | 5/2002 | |
| WO | WO 02/063800 | 8/2002 | |
| WO | PCT/US04/11130 | 10/2004 | |
| WO | WO 2004/098100 | 11/2004 | |

OTHER PUBLICATIONS

Hausdorf, "Mobile Transceiver Measurements with Radiocommunication Service Monitor CMS", News from Rohde & Schwarz, 127, IV, 1989, pp. 4-7.

Mendez, J. "A Circuit to Provide Protection from Surge Voltages (for CB Transceiver)", Revista Española de Electronica, May 1984, pp. 37-39.

Einwaechter and Fritz, "Shortwave Transmitter & Receiver System FuG 101 for Telegraphy and Telephony", Siemens Review XLII, No. 12, 1976, pp. 526-529.

Dallas Semiconductor, DS1849 Transceiver Controller, Product Information.

Maeda, Examiner Noriyuki "Notification of Reason(s) for Refusal," Japanese Patent Application No. JP2002-563630, Nakamura, M. et al., Jul. 13, 2005.

Finisar Corp., "App Note AN-2025: Using the Finisar GBIC I$^2$C Test Diagnostics Port," 1998.

"Annex 48B (Jitter Test Methods)", *Analog Target Specification*, , IEEE, Jan. 2001, pp. 6-14.

"I2C", Webopedia.com, www.webopedia.com/TERM/I/I2C.html, last modified Mar. 12, 2002.

"MAC address", Webopedia.com, www.webopedia.com/TERM/M/MAC_address.html (no date).

"Public-Key Encryption", http://www.webopedia.com/term/p/public_key_cryptography.html. (no date).

"The 7 Layers of the OSI Model", Webopedia, http://webopedia.internet.com/quick_ref/OSI-Layers.asp. (no date).

ATMEL, IR Receiver ASSP T2525, Product Information, Rev. 4657C-Auto, Oct. 2003.

ATMEL, IR Receiver for Data Communication U2538B, Product Information, Rev. 4717A-IRRC, May 2003.

ATMEL, Low-voltage Highly Selective IR Receiver IC, T2527, Rev. 4600B—IRDC Dec. 2002.

ATMEL, Selection Guide—Infrared Receiver ICs T2525/T2526/T2527 for Use in IR Receiver Module Application, T2525/26/27, Application Note, Rev. 4672A, Feb. 2003.

Cai, Yi, et al., "Jitter testing for gigabit serial communication transcievers", *Design & Test of Computers*, IEEE, vol. 19, Issue 1, Jan.-Feb. 2002, pp. 66-74.

Fairchild Semiconductor, "CMOS, the Ideal Logic Family", Application Note 77, Jan. 1983.

Fairhurst, Gorry, "Manchester Encoding", www.erg.abdn.ac.uk/users/gorry/course/phy-pages/man.html, Jan. 9, 2001.

Infineon Technologies, OptiPort™ SFF BiDi®-Transceiver 100 Mbit/s, 1310 nm Tx/1550 nm Rx, V23870-A 1133-Kx01, Data Sheet, Jun. 22, 2004.

Intel, LXT-16706/16707 SerDes Chipset, Product Information, www.intel.com/design/network/products/optical/phys/lxt16706.htm, (no date).

Intl, LXT35401 XAUI-to-Quad 3.2G Transceiver, Product Information, www/intel.com/design/network/products/optical/phys/lxt35401.htm, (no date).

National Semiconductor, *DS92LV16 Design Guide*, Feb. 2002.

Texas Instruments, *TLK1501 Serdes EVM Kit Setup and Usage, Users Guide*, SLLU008, Jun. 2000.

Texas Instruments, *TLK2201 Serdes EVM Kit Setup and Usage, Users Guide*, SLLU011, Jun. 2000.

Vaishali Semiconductor, *Fibre Channel Transceiver VN16117*, preliminary Product Information, MDSN-0002-02, Aug. 9, 2001.

* cited by examiner

OPTOELECTRONIC TRANSCEIVER HAVING DUAL ACCESS TO ONBOARD DIAGNOSTICS

This application claims priority to and is a continuation-in-part of U.S. patent application Ser. No. 09/777,917, filed Feb. 5, 2001, which is hereby incorporated by reference.

BACKGROUND OF THE INVENTION

1. Field of the Invention

The present invention relates generally to the field of optoelectronic transceivers and particularly to circuits used within the optoelectronic transceivers to accomplish control, setup, monitoring, and identification operations.

2. Description of Related Art

The two most basic electronic circuits within a fiber optic transceiver are the laser driver circuit, which accepts high speed digital data and electrically drives an LED or laser diode to create equivalent optical pulses, and the receiver circuit which takes relatively small signals from an optical detector and amplifies and limits them to create a uniform amplitude digital electronic output. In addition to, and sometimes in conjunction with these basic functions, there are a number of other tasks that must be handled by the transceiver circuitry as well as a number of tasks that may optionally be handled by the transceiver circuit to improve its functionality. These tasks include, but are not necessarily limited to, the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory is preferably accessible using a serial communication standard, that is used to store various information identifying the transceiver type, capability, serial number, and compatibility with various standards. While not standard, it would be desirable to further store in this memory additional information, such as sub-component revisions and factory test data.

Eye safety and general fault detection. These functions are used to identify abnormal and potentially unsafe operating parameters and to report these to the user and/or perform laser shutdown, as appropriate.

In addition, it would be desirable in many transceivers for the control circuitry to perform some or all of the following additional functions:

Temperature compensation functions. For example, compensating for known temperature variations in key laser characteristics such as slope efficiency.

Monitoring functions. Monitoring various parameters related to the transceiver operating characteristics and environment. Examples of parameters that it would be desirable to monitor include laser bias current, laser output power, received power level, supply voltage and temperature. Ideally, these parameters should be monitored and reported to, or made available to, a host device and thus to the user of the transceiver.

Power on time. It would be desirable for the transceiver's control circuitry to keep track of the total number of hours the transceiver has been in the power on state, and to report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. It would be desirable to enable a host device to be able to configure the transceiver so as to make it compatible with various requirements for the polarity and output types of digital inputs and outputs. For instance, digital inputs are used for transmitter disable and rate selection functions while outputs are used to indicate transmitter fault and loss of signal conditions. The configuration values would determine the polarity of one or more of the binary input and output signals. In some transceivers it would be desirable to use the configuration values to specify the scale of one or more of the digital input or output values, for instance by specifying a scaling factor to be used in conjunction with the digital input or output value.

Few if any of these additional functions are implemented in most transceivers, in part because of the cost of doing so. Some of these functions have been implemented using discrete circuitry, for example using a general purpose EEPROM for identification purposes, by inclusion of some functions within the laser driver or receiver circuitry (for example some degree of temperature compensation in a laser driver circuit) or with the use of a commercial microcontroller integrated circuit. However, to date there have not been any transceivers that provide a uniform device architecture that will support all of these functions, as well as additional functions not listed here, in a cost effective manner.

It is the purpose of the present invention to provide a general and flexible integrated circuit that accomplishes all (or any subset) of the above functionality using a straightforward memory mapped architecture and a simple serial communication mechanism.

FIG. 1 shows a schematic representation of the essential features of a typical prior-art fiber optic transceiver. The main circuit 1 contains at a minimum transmit and receiver circuit paths and power 19 and ground connections 18. The receiver circuit typically consists of a Receiver Optical Subassembly (ROSA) 2 which contains a mechanical fiber receptacle as well as a photodiode and pre-amplifier (preamp) circuit. The ROSA is in turn connected to a post-amplifier (postamp) integrated circuit 4, the function of which is to generate a fixed output swing digital signal which is connected to outside circuitry via the RX+ and RX− pins 17. The postamp circuit also often provides a digital output signal known as Signal Detect or Loss of Signal indicating the presence or absence of suitably strong optical input. The Signal Detect output is provided as an output on pin 18. The transmit circuit will typically consist of a Transmitter Optical Subassembly (TOSA), 3 and a laser driver integrated circuit 5. The TOSA contains a mechanical fiber receptacle as well as a laser diode or LED. The laser driver circuit will typically provide AC drive and DC bias current to the laser. The signal inputs for the AC driver are obtained from the TX+ and TX− pins 12. Typically, the laser driver circuitry will require individual factory setup of certain parameters such as the bias current (or output power) level and AC modulation drive to the laser. Typically this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6, 8.

In addition to the most basic functions described above, some transceiver platform standards involve additional functionality. Examples of this are the TX disable 13 and TX fault 14 pins described in the GBIC standard. In the GBIC standard, the TX disable pin allows the transmitter to be shut off by the host device, while the TX fault pin is an indicator to the host device of some fault condition existing in the laser or associated laser driver circuit. In addition to this basic description, the GBIC standard includes a series of timing diagrams describing how these controls function and interact with each other to implement reset operations and other actions. Most of this functionality is aimed at preventing non-eyesafe emission levels when a fault conditions exists in the laser circuit. These functions may be integrated into the laser driver circuit itself or in an optional additional integrated circuit 11. Finally, the GBIC standard also requires the EEPROM 10 to store standardized serial ID information that can be read out via a serial interface (defined as using the serial interface of the ATMEL AT24C01A family of EEPROM products) consisting of a clock 15 and data 16 line.

As an alternative to mechanical fiber receptacles, some prior art transceivers use fiber optic pigtails which are standard, male fiber optic connectors.

Similar principles clearly apply to fiber optic transmitters or receivers that only implement half of the full transceiver functions.

Furthermore, different external hosts may communicate using different communications protocols. Also, such different external hosts may require accessing different memory locations than those provided by current optoelectronic transceiver. Accordingly, it would be highly desirable to provide an optoelectronic transceiver with the additional functionality described above, while providing additional access to onboard functionality and diagnostic data.

SUMMARY OF THE INVENTION

The present invention is preferably implemented as a single-chip integrated circuit, sometimes called a controller, for controlling a transceiver having a laser transmitter and a photodiode receiver. The controller includes memory for storing information related to the transceiver, and analog to digital conversion circuitry for receiving a plurality of analog signals from the laser transmitter and photodiode receiver, converting the received analog signals into digital values, and storing the digital values in predefined locations within the memory. Comparison logic compares one or more of these digital values with limit values, generates flag values based on the comparisons, and stores the flag values in predefined locations within the memory. Control circuitry in the controller controls the operation of the laser transmitter in accordance with one or more values stored in the memory. A serial interface is provided to enable a host device to read from and write to locations within the memory. A plurality of the control functions and a plurality of the monitoring functions of the controller are exercised by a host computer by accessing corresponding memory mapped locations within the controller.

In some embodiments the controller further includes a cumulative clock for generating a time value corresponding to cumulative operation time of the transceiver, wherein the generated time value is readable via the serial interface.

In some embodiments the controller further includes a power supply voltage sensor that generates a power level signal corresponding to a power supply voltage level of the transceiver. In these embodiments the analog to digital conversion circuitry is configured to convert the power level signal into a digital power level value and to store the digital power level value in a predefined power level location within the memory. Further, the comparison logic of the controller may optionally include logic for comparing the digital power level value with a power (i.e., voltage) level limit value, generating a flag value based on the comparison of the digital power level signal with the power level limit value, and storing a power level flag value in a predefined power level flag location within the memory. It is noted that the power supply voltage sensor measures the transceiver voltage supply level, which is distinct from the power level of the received optical signal.

In some embodiments the controller further includes a temperature sensor that generates a temperature signal corresponding to a temperature of the transceiver. In these embodiments the analog to digital conversion circuitry is configured to convert the temperature signal into a digital temperature value and to store the digital temperature value in a predefined temperature location within the memory. Further, the comparison logic of the controller may optionally include logic for comparing the digital temperature value with a temperature limit value, generating a flag value based on the comparison of the digital temperature signal with the temperature limit value, and storing a temperature flag value in a predefined temperature flag location within the memory.

In some embodiments the controller further includes "margining" circuitry for adjusting one or more control signals generated by the control circuitry in accordance with an adjustment value stored in the memory.

According to the invention there is provided an optoelectronic transceiver. The optoelectronic transceiver includes a first controller integrated circuit (IC) and a second controller IC. Each controller IC includes logic, a memory, an interface, and at least one input port. The memory is configured to store digital diagnostic data. At least some of the digital diagnostic data is common to both the first controller IC and the second controller IC. The interface is electrically coupled to the memory and configured for communicating the diagnostic data to a host external to the optoelectronic transceiver. The at least one input port is electrically coupled to the memory and configured to receive the diagnostic data from other components within the optoelectronic transceiver. Such other components preferably include a Transmitter Optical Subassembly (TOSA), Receiver Optical Subassembly (ROSA), laser driver IC, a post amplifier IC, an Avalanche Photodiode (APD) power supply, a Thermoelectric Cooler (TEC) driver IC, and a power controller.

In a preferred embodiment, the interface is a serial interface, such as an I2C, 2Wire, or MDIO serial interface. The optoelectronic transceiver may also include a Transmitter Optical Subassembly (TOSA), a Receiver Optical Subassembly (ROSA), a laser driver, a post amplifier, an Avalanche Photodiode (APD) power supply, a Thermoelectric Cooler (TEC) driver, a power controller, a pre-amplifier, a laser wavelength controller, an analog-to-digital converter, a digital-to analog converter, or any combination of the aforementioned components. The diagnostic data is preferably stored in different memory mapped locations in the first controller IC and in the second controller IC. Also in a preferred embodiment, the at least one output port of the first controller IC is electrically coupled to an Avalanche Photodiode (APD) power supply to supply an APD control signal, and coupled to a laser driver IC to supply a direct current (DC) bias control signal. Similarly, the at least one output port of the second controller IC is preferably electrically coupled to a laser driver IC to provide an alternating current (AC) control signal, and coupled to a Thermoelectric Cooler (TEC) driver IC to supply a TEC control signal.

The first controller IC preferably further comprises at least one input port electrically coupled to: an Avalanche Photodiode (APD) power supply to receive a photodiode monitor signal; a post amplifier IC to receive a loss of received power (RxLOS) signal; and a laser driver IC to receive a direct current (DC) bias signal and a laser diode monitor signal. Similarly, the second controller IC preferably further comprises at least one input port electrically coupled to: an Avalanche Photodiode (APD) power supply to receive a photodiode monitor signal; a laser driver IC to receive a direct current (DC) bias monitor signal and a laser diode monitor signal; and a Thermoelectric Cooler (TEC) driver IC to receive a TEC temperature signal.

In use, the first controller IC is configured to control direct current (DC) bias current supplied to a Transmitter Optical Subassembly (TOSA), and is configured to control Avalanche Photodiode (APD) power supplied to a Receiver Optical Subassembly (ROSA). Similarly, the second controller IC is configured to control alternating current (AC) current supplied to a Transmitter Optical Subassembly (TOSA), and configured to control a Thermoelectric Cooler (TEC) in a Transmitter Optical Subassembly (TOSA).

According to another embodiment of the invention, there is provided another optoelectronic transceiver that includes an optoelectronic transmitter, an optoelectronic receiver, a laser driver, a post amplifier, and first and second controller ICs. The laser driver is electrically coupled to the optoelectronic transmitter, while the post amplifier is electrically coupled to the optoelectronic receiver. The first controller integrated circuit (IC) is electrically coupled to the laser driver. The first controller IC is configured to supply a direct current (DC) bias current control signal to the laser driver causing the laser driver to supply DC bias current to the optoelectronic transmitter. The second controller IC is electrically coupled to the laser driver to supply an alternating current (AC) current control signal to the laser driver causing the laser driver to supply AC current to the optoelectronic transmitter. The optoelectronic receiver preferably includes an Avalanche Photodiode (APD). The APD, is electrically coupled to an APD power supply that is electrically coupled to the first controller IC. The first controller IC is configured to supply an APD power supply control signal to the APD power supply causing the APD power supply to supply an APD voltage to the APD. The optoelectronic transmitter preferably includes a Thermoelectric Cooler (TEC). The TEC is electrically coupled to an TEC driver that is electrically coupled to the second controller IC. The second controller IC is configured to supply a TEC control signal to the TEC driver causing the TEC driver to control the TEC.

Accordingly, multiple controller ICs within the optoelectronic transceiver provide a remote host with separate access to diagnostic data on each controller IC. This allows hosts that are preconfigured differently to read different memory mapped locations on the different controller ICs to obtain the same diagnostic data. Furthermore, the interfaces in the first and second controller ICs may be configured to communicate using different protocols. This allows the same optoelectronic transceiver to be used with hosts that communicate using different protocols without any redesign or reconfiguration of the optoelectronic transceiver.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF PREFERRED EMBODIMENTS

Figure 1:
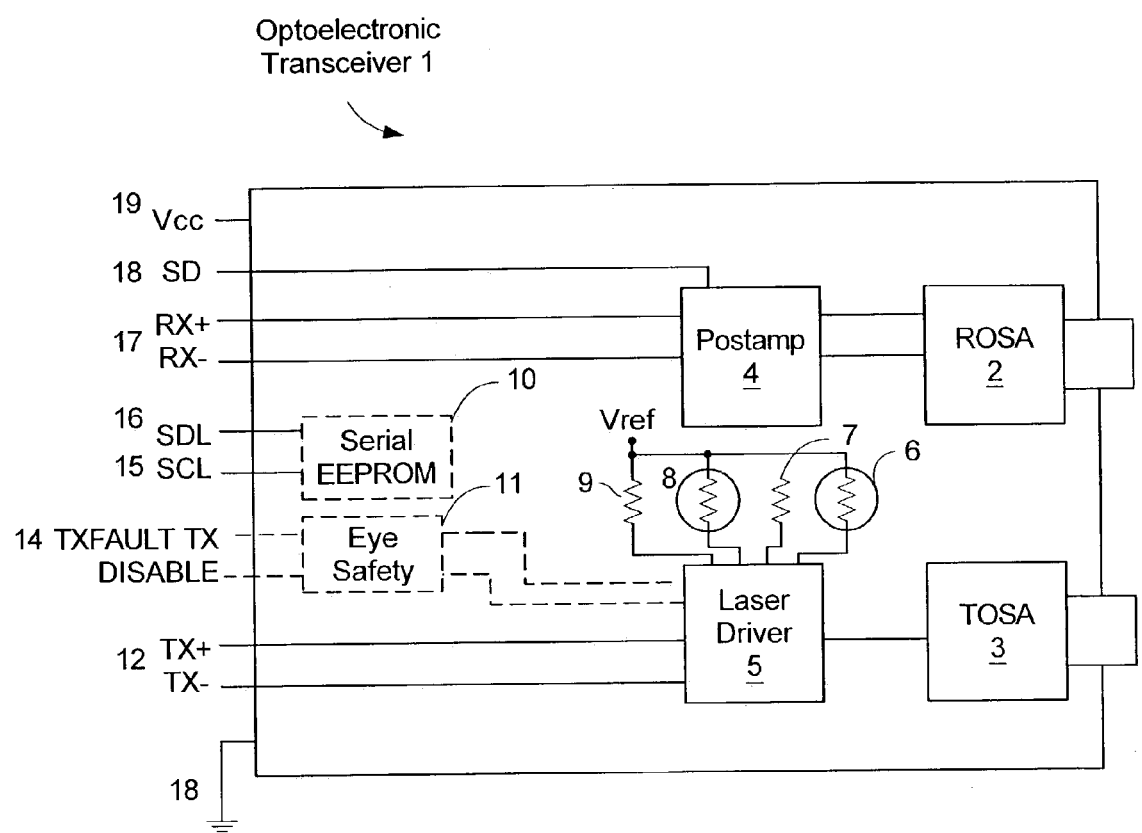
FIG. 1 is a block diagram of a prior art optoelectronic transceiver.
Figure 2:
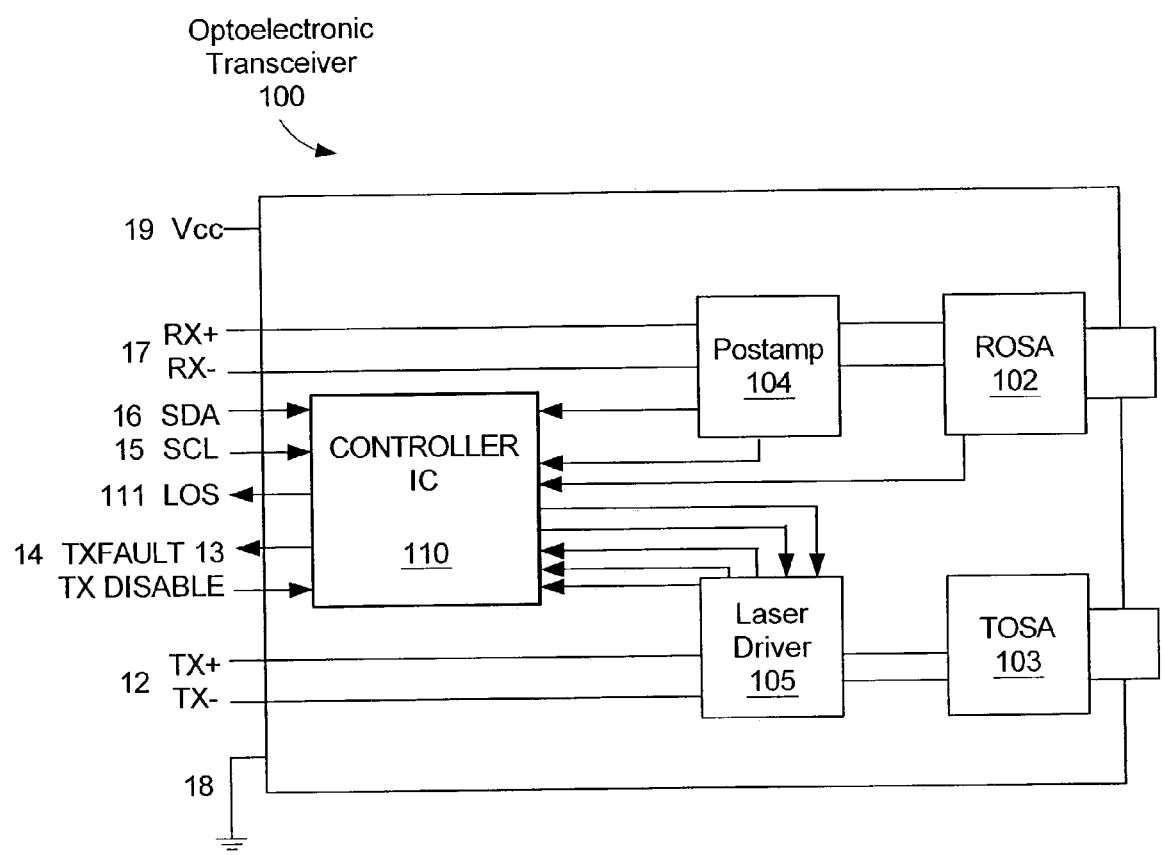
FIG. 2 is a block diagram of an optoelectronic transceiver in accordance with the present invention.
Figure 3:
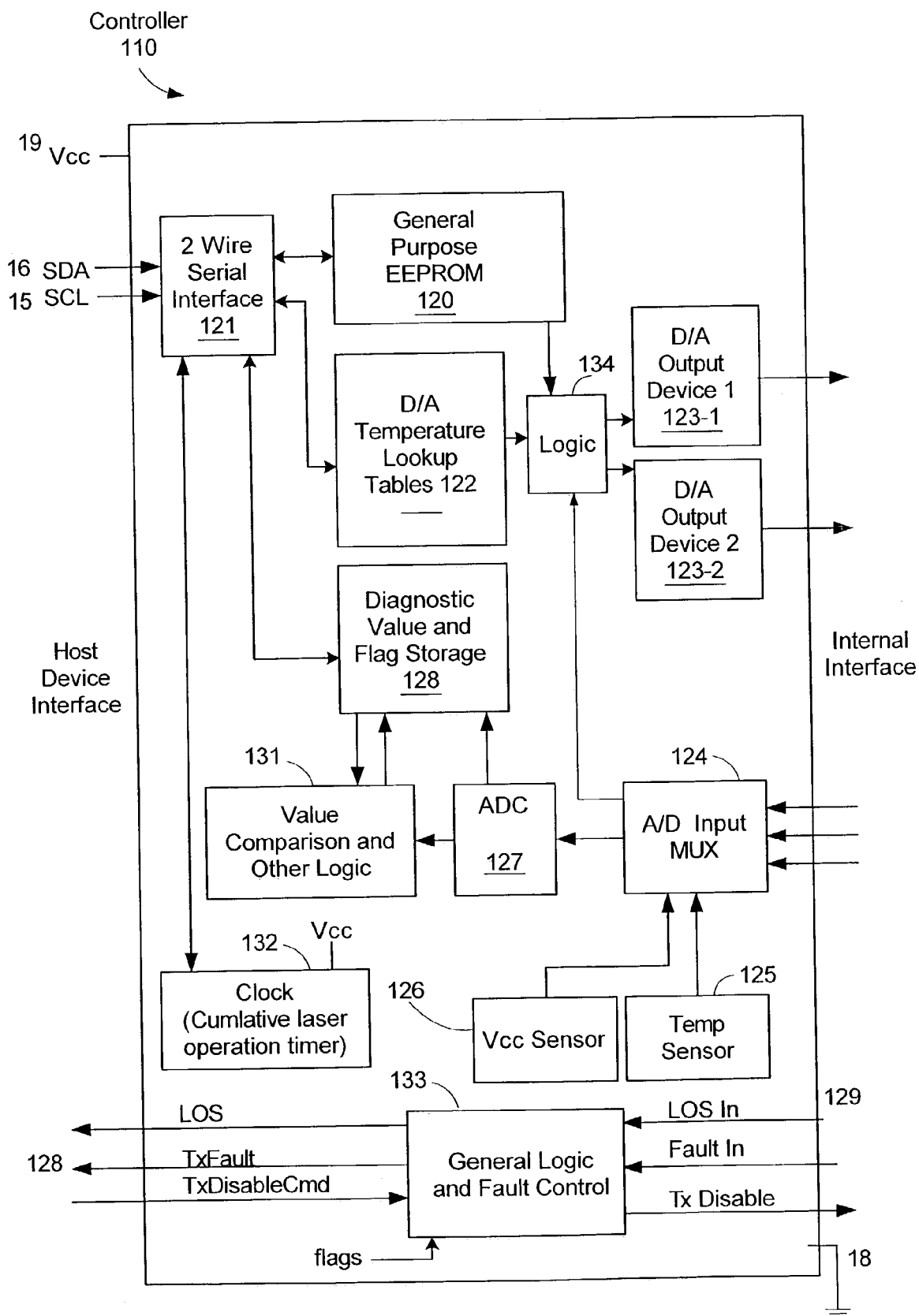
FIG. 3 is a block diagram of modules within the controller of the optoelectronic transceiver of FIG. 2.

A transceiver 100 based on the present invention is shown in FIGS. 2 and 3. The transceiver 100 contains a Receiver Optical Subassembly (ROSA) 102 and Transmitter Optical Subassembly (TOSA) 103 along with associated post-amplifier 104 and laser driver 105 integrated circuits that communicate the high speed electrical signals to the outside world. In this case, however, all other control and setup functions are implemented with a third single-chip integrated circuit 110 called the controller IC.

The controller IC 110 handles all low speed communications with the end user. These include the standardized pin functions such as Loss of Received Signal (LOS) 111, Transmitter Fault Indication (TX FAULT) 14, and the Transmitter Disable Input (TXDIS) 13. The controller IC 110 has a two wire serial interface 121, also called the memory interface, for accessing memory mapped locations in the controller. Memory Map Tables 1, 2, 3 and 4, below, are an exemplary memory map for one embodiment of a transceiver controller, as implemented in one embodiment of the present invention. It is noted that Memory Map Tables 1, 2, 3 and 4, in addition to showing a memory map of values and control features described in this document, also show a number of parameters and control mechanisms that are outside the scope of this document and thus are not part of the present invention.

The interface 121 is coupled to host device interface input/output lines, typically clock (SCL) and data (SDA) lines, 15 and 16. In the preferred embodiment, the serial interface 121 operates in accordance with the two wire serial interface standard that is also used in the GBIC and SFP standards, however other serial interfaces could equally well be used in alternative embodiments. The two wire serial interface 121 is used for all setup and querying of the controller IC 110, and enables access to the optoelectronic transceiver's control circuitry as a memory mapped device. That is, tables and parameters are set up by writing values to predefined memory locations of one or more nonvolatile memory devices 120, 122, 128 (e.g., EEPROM devices) in the controller, whereas diagnostic and other output and status values are output by reading predetermined memory locations of the same nonvolatile memory devices 120, 121, 122. This technique is consistent with currently defined serial ID functionality of many transceivers where a two wire serial interface is used to read out identification and capability data stored in EEPROM.

It is noted here that some of the memory locations in the memory devices 120, 122, 128 are dual ported, or even triple ported in some instances. That is, while these memory mapped locations can be read and in some cases written via the serial interface 121, they are also directly accessed by other circuitry in the controller 110. For instance, certain "margining" values stored in memory 120 are read and used directly by logic 134 to adjust (i.e., scale upwards or downwards) drive level signals being sent to the D/A output devices 123. Similarly, there are flags stored memory 128 that are (A) written by logic circuit 131, and (B) read directly by logic circuit 133. An example of a memory mapped location not in memory devices but that is effectively dual ported is the output or result register of clock 132. In this case the accumulated time value in the register is readable via the serial interface 121, but is written by circuitry in the clock circuit 132.

In addition to the result register of the clock 132, other memory mapped locations in the controller may be implemented as registers at the input or output of respective sub-circuits of the controller. For instance, the margining values used to control the operation of logic 134 may be stored in registers in or near logic 134 instead of being stored within memory device 128. In another example, measurement values generated by the ADC 127 may be stored in registers. The memory interface 121 is configured to enable the memory interface to access each of these registers whenever the memory interface receives a command to access the data stored at the corresponding predefined memory mapped location. In such embodiments, "locations within the memory" include memory mapped registers throughout the controller.

In an alternative embodiment, the time value in the result register of the clock 132, or a value corresponding to that time value, is periodically stored in a memory location with the memory 128 (e.g., this may be done once per minute, or one per hour of device operation). In this alternative embodiment, the time value read by the host device via interface 121 is the last time value stored into the memory 128, as opposed to the current time value in the result register of the clock 132.

As shown in FIGS. 2 and 3, the controller IC 110 has connections to the laser driver 105 and receiver components. These connections serve multiple functions. The controller IC has a multiplicity of D/A converters 123. In the preferred embodiment the D/A converters are implemented as current sources, but in other embodiments the D/A converters may be implemented using voltage sources, and in yet other embodiments the D/A converters may be implemented using digital potentiometers. In the preferred embodiment, the output signals of the D/A converters are used to control key parameters of the laser driver circuit 105. In one embodiment, outputs of the D/A converters 123 are use to directly control the laser bias current as well as to control of the level AC modulation to the laser (constant bias operation). In another embodiment, the outputs of the D/A converters 123 of the controller 110 control the level of average output power of the laser driver 105 in addition to the AC modulation level (constant power operation). In yet another embodiment, the outputs of the D/A converters 123 of the controller 110 are used to control the laser bias current as well as to control the biasing of an avalanche photodiode (APD).

In a preferred embodiment, the controller 110 includes mechanisms to compensate for temperature dependent characteristics of the laser. This is implemented in the controller 110 through the use of temperature lookup tables 122 that are used to assign values to the control outputs as a function of the temperature measured by a temperature sensor 125 within the controller IC 110. In alternative embodiments, the controller 110 may use D/A converters with voltage source outputs or may even replace one or more of the D/A converters 123 with digital potentiometers to control the characteristics of the laser driver 105. It should also be noted that while FIG. 2 refers to a system where the laser driver 105 is specifically designed to accept inputs from the controller 110, it is possible to use the controller IC 110 with many other laser driver ICs to control their output characteristics.

In addition to temperature dependent analog output controls, the controller IC may be equipped with a multiplicity of temperature independent (one memory set value) analog outputs. These temperature independent outputs serve numerous functions, but one particularly interesting application is as a fine adjustment to other settings of the laser driver 105 or postamp 104 in order to compensate for process induced variations in the characteristics of those devices. One example of this might be the output swing of the receiver postamp 104. Normally such a parameter would be fixed at design time to a desired value through the use of a set resistor. It often turns out, however, that normal process variations associated with the fabrication of the postamp integrated circuit 104 induce undesirable variations in the resulting output swing with a fixed set resistor. Using the present invention, an analog output of the controller IC 110, produced by an additional D/A converter 123, is used to adjust or compensate the output swing setting at manufacturing setup time on a part-by-part basis.

In addition to the connection from the controller to the laser driver 105, FIG. 2 shows a number of connections from the laser driver 105 to the controller IC 110, as well as similar connections from the ROSA 106 and Postamp 104 to the controller IC 110. These are analog monitoring connections that the controller IC 110 uses to provide diagnostic feedback to the host device via memory mapped locations in the controller IC. The controller IC 110 in the preferred embodiment has a multiplicity of analog inputs. The analog input signals indicate operating conditions of the transceiver and/or receiver circuitry. These analog signals are scanned by a multiplexer 124 and converted using an analog to digital converter (ADC) 127. The ADC 127 has 12 bit resolution in the preferred embodiment, although ADC's with other resolution levels may be used in other embodiments. The converted values are stored in predefined memory locations, for instance in the diagnostic value and flag storage device 128 shown in FIG. 3, and are accessible to the host device via memory reads. These values are calibrated to standard units (such as millivolts or microwatts) as part of a factory calibration procedure.

The digitized quantities stored in memory mapped locations within the controller IC include, but are not limited to, the laser bias current, transmitted laser power, and received power (as measured by the photodiode detector in the ROSA 102). In the memory map tables (e.g., Table 1), the measured laser bias current is denoted as parameter $B_{in}$, the measured transmitted laser power is denoted as $P_{in}$, and the measured received power is denoted as $R_{in}$. The memory map tables indicate the memory locations where, in an exemplary implementation, these measured values are stored, and also show where the corresponding limit values, flag values, and configuration values (e.g., for indicating the polarity of the flags) are stored.

As shown in FIG. 3, the controller 110 includes a voltage supply sensor 126. An analog voltage level signal generated by this sensor is converted to a digital voltage level signal by the ADC 127, and the digital voltage level signal is stored in memory 128. In a preferred embodiment, the A/D input mux 124 and ADC 127 are controlled by a clock signal so as to automatically, periodically convert the monitored signals into digital signals, and to store those digital values in memory 128.

Furthermore, as the digital values are generated, the value comparison logic 131 of the controller compares these values to predefined limit values. The limit values are preferably stored in memory 128 at the factory, but the host device may overwrite the originally programmed limit values with new limit values. Each monitored signal is automatically compared with both a lower limit and upper limit value, resulting in the generation of two limit flag values that are then stored in the diagnostic value and flag storage device 128. For any monitored signals where there is no meaningful upper or lower limit, the corresponding limit value can be set to a value that will never cause the corresponding flag to be set.

The limit flags are also sometimes call alarm and warning flags. The host device (or end user) can monitor these flags to determine whether conditions exist that are likely to have caused a transceiver link to fail (alarm flags) or whether conditions exist which predict that a failure is likely to occur soon. Examples of such conditions might be a laser bias current which has fallen to zero, which is indicative of an immediate failure of the transmitter output, or a laser bias current in a constant power mode which exceeds its nominal value by more than 50%, which is an indication of a laser end-of-life condition. Thus, the automatically generated limit flags are useful because they provide a simple pass-fail decision on the transceiver functionality based on internally stored limit values.

Logic 131 preferably includes a plurality of state machines for executing control functions which require sequences of operations to be performed, such as converting a temperature sensor reading into an index value, and delivering that index value to the temperature lookup tables 122 using a connection not shown in FIG. 3. The analog to digital conversions by ADC 127, the comparison of signals with limit values and the generation of limit flags are also handled in part by state machines within the logic 131. The state machines in logic 131 are configured so as to periodically repeat all the basic operations of the controller 110.

In a preferred embodiment, fault control and logic circuit 133 logically OR's the alarm and warning flags, along with the internal LOS (loss of signal) input and Fault Input signals, to produce a binary Transceiver fault (TxFault) signal that is coupled to the host interface, and thus made available to the host device. The host device can be programmed to monitor the TxFault signal, and to respond to an assertion of the TxFault signal by automatically reading all the alarm and warning flags in the transceiver, as well as the corresponding monitored signals, so as to determine the cause of the alarm or warning.

The fault control and logic circuit 133 furthermore conveys a loss of signal (LOS) signal received from the receiver circuit (ROSA, FIG. 2) to the host interface.

Another function of the fault control and logic circuit 133 is to disable the operation of the transmitter (TOSA, FIG. 2) when needed to ensure eye safety. There is a standards defined interaction between the state of the laser driver and the Tx Disable output, which is implemented by the fault control and logic circuit 133. When the logic circuit 133 detects a problem that might result in an eye safety hazard, the laser driver is disabled by activating the Tx Disable signal of the controller. The host device can reset this condition by sending a command signal on the TxDisableCmd line of the host interface.

Yet another function of the fault control and logic circuit 133 is to determine the polarity of its input and output signals in accordance with a set of configuration flags stored in memory 128. For instance, the Loss of Signal (LOS) output of circuit 133 may be either a logic low or logic high signal, as determined by a corresponding configuration flag stored in memory 128.

Other configuration flags (see Table 4) stored in memory 128 are used to determine the polarity of each of the warning and alarm flags. Yet other configuration values stored in memory 128 are used to determine the scaling applied by the ADC 127 when converting each of the monitored analog signals into digital values.

In an alternative embodiment, another input to the controller 102, at the host interface, is a rate selection signal. In FIG. 3 the rate selection signal is input to logic 133. This host generated signal would typically be a digital signal that specifies the expected data rate of data to be received by the receiver (ROSA 102). For instance, the rate selection signal might have two values, representing high and low data rates (e.g., 2.5 Gb/s and 1.25 Gb/s). The controller responds to the rate selection signal by generating control signals to set the analog receiver circuitry to a bandwidth corresponding to the value specified by the rate selection signal.

Figure 4:
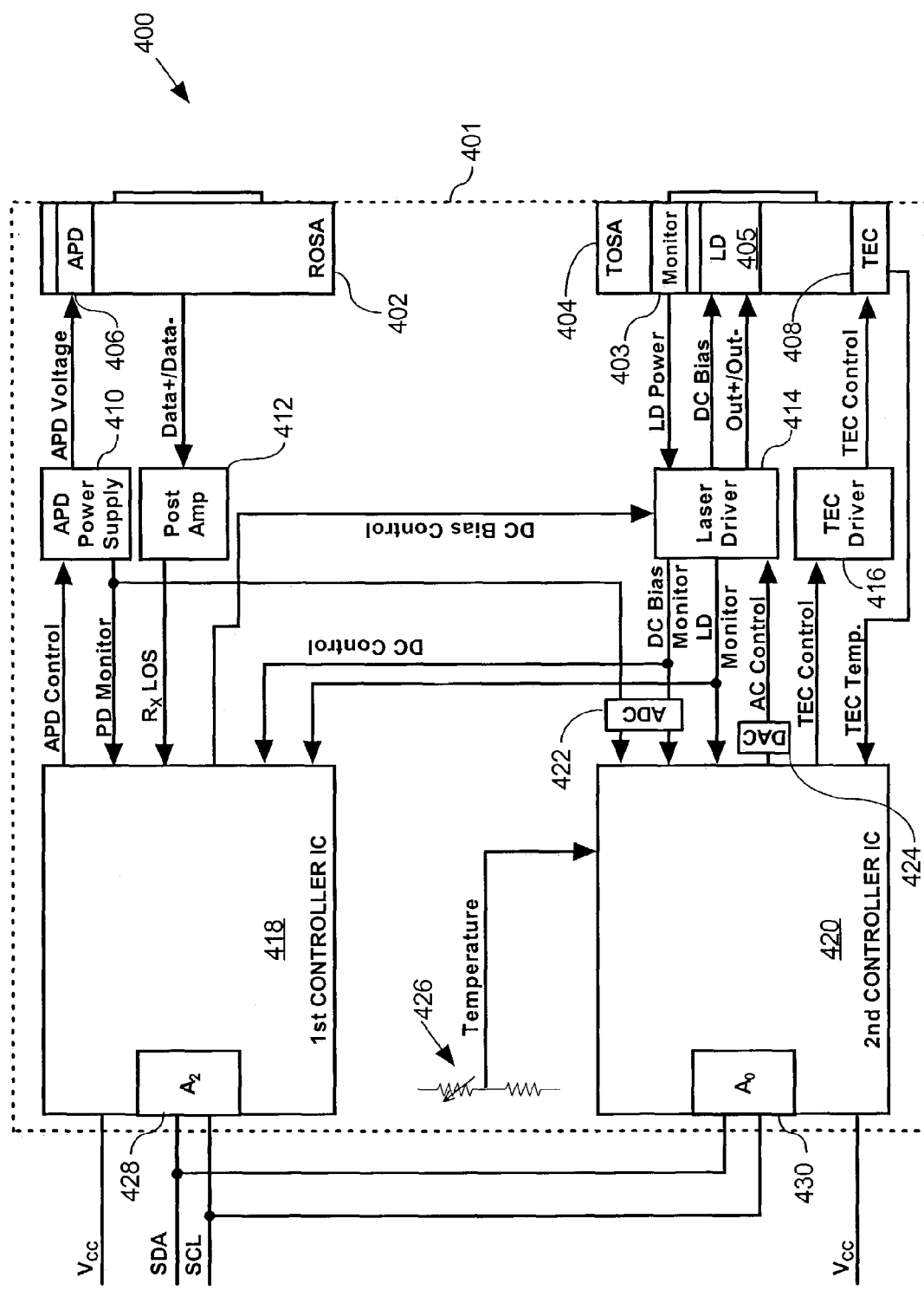
FIG. 4 is a block diagram of another optoelectronic transceiver in accordance with another embodiment of the present invention.

FIG. 4 is a block diagram of another optoelectronic transceiver 400 in accordance with another embodiment of the present invention. The optoelectronic transceiver 400 is preferably housed within a single housing 401. The optoelectronic transceiver 400 includes an optoelectronic receiver and an optoelectronic transmitter. The optoelectronic receiver preferably forms part of a Receiver Optical Subassembly (ROSA) 402, while the optoelectronic transmitter preferably forms part of a Transmitter Optical Subassembly (TOSA) 404, as described above.

In a preferred embodiment, the optoelectronic receiver is an Avalanche Photodiode (APD) 406. An APD is a photodiode that exhibits internal amplification of photocurrent through avalanche multiplication of carriers in the junction region. Such amplification requires a relatively high supply voltage, typically in the range of about 30 V–70 V, shown as APD Voltage in FIG. 4. This voltage is supplied to the APD by an isolated APD power supply 410. The optoelectronic receiver is also coupled to a post amplifier 412, as described above.

Optical signals received by the optoelectronic receiver in the ROSA 402 are transmitted along a received power connection, shown as Data+/Data– in FIG. 4, to the post amplifier 412. The post amplifier 412 generates a fixed output swing digital signal which is connected to a remote host via RX+ and RX– connections, as described above.

The optoelectronic transmitter is preferably a LED or laser diode 405, and is electrically coupled to a laser driver 414. In use, the optoelectronic transmitter within the TOSA 404 is not turned on and off, but rather modulated between high and low levels above a threshold current. This threshold current or DC bias current, shown as DC Bias in FIG. 4, is supplied to the TOSA 404 from the laser driver 414. The modulation current, or AC current, shown as Out+/Out– in FIG. 4, is also supplied to the optoelectronic transmitter from the laser driver 414. The level of the DC bias current is adjusted to maintain proper laser output (i.e., to maintain a specified or predefined average level of optical output power by the optoelectronic transmitter) and to compensate for variations in temperature and power supply voltage. In use, a host transmits signal inputs TX+ and TX− to the laser driver 414 via TX+ and TX− connections, as described above (but not shown in FIG. 4).

In a preferred embodiment, a Thermoelectric Cooler (TEC) 408 is disposed within the TOSA 404 to dissipate heat from the optoelectronic transmitter, or more generally to regulate the temperature of the optoelectronic transmitter 405. The TEC 408 is electrically coupled to, and controlled by, a TEC driver 416.

In addition, some optoelectronic transceivers include an output power monitor 403 within the TOSA 404 that monitors the energy output from the optoelectronic transmitter. The output power monitor 403 is preferably a photodiode within the laser package that measures light emitted from the back facet of the laser diode 405. In general, the amount of optical power produced by the back facet of the laser diode, represented by an output power signal, is directly proportional to the optical power output by the front or main facet of the laser diode 405. The ratio, K, of the back facet optical power to the front facet optical power will vary from one laser diode to another, even among laser diodes of the same type. This ratio is determined during device setup and calibration. The output power monitor signal, shown as LD Power in FIG. 4, is supplied from the output power monitor 403 in the TOSA 404 to the two controller ICs 418 and 420.

The optoelectronic transceiver 400 also includes at least two controller integrated circuits (ICs) 418 and 420. The first controller IC 418 is preferably configured to control the DC bias current supplied to the TOSA 404 and to control the voltage supplied to the APD 406. The second controller IC 420 is preferably configured to control the AC current supplied to the TOSA 404, and to control the TEC 408. In addition, both the first and second controller ICs are preferably configured to gather diagnostic data from the various optoelectronic transceiver components, store this diagnostic data, and provide this diagnostic data to a remote host (not shown).

The first controller IC 418 is identical to the controller IC 110 described above in relation to FIGS. 2 and 3. As shown in FIG. 3, the first controller IC 418 includes internal analog to digital conversion circuitry 124 (FIG. 3), and digital to analog conversion circuitry 123 (FIG. 3). Therefore, the first controller IC 418 is capable of receiving and transmitting both analog and digital signals. While the first controller 48 is preferably the same as the controller IC 110 described above, in this embodiment the output of one of its D/A converters is used to control the power supply 410 for an avalanche photodiode 406.

Figure 5:
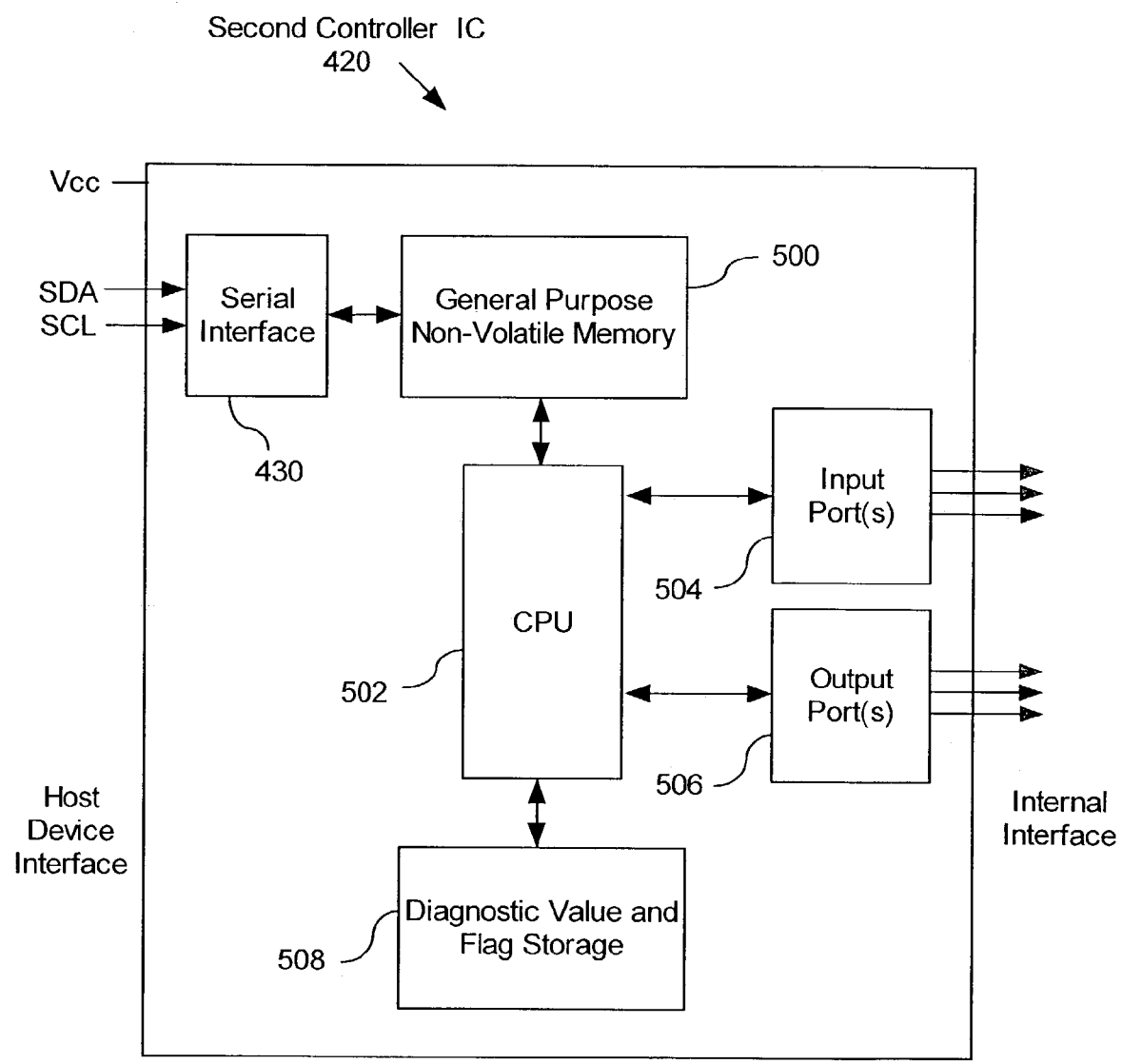
FIG. 5 is a more detailed block diagram of the second controller IC shown in FIG. 4.

The second controller IC 420 preferably includes many of the same components as the first controller IC 418, with the primary exception being that the second controller IC 420 has a central processing unit (CPU) 502 (FIG. 5) that executes stored programs instead of the fixed logic and state machines of the first controller IC 418. The CPU 502 of this second controller 420 is better suited for controlling the TEC (i.e., generating TEC control signals so as to maintain the temperature in the TOSA 404 at a specified target temperature) than the more limited state machine logic of the first controller IC 418. FIG. 5 is a more detailed block diagram of the second controller IC 420 shown in FIG. 4. The second controller IC 420 includes: a CPU 502, as just mentioned; at least one input port 504; at least one output port; general purpose non-volatile memory, such as EEPROM or FLASH, similar to the EEPROM 120 (FIG. 3) described above; diagnostic value and flag storage 508 similar to the storage 128 (FIG. 3) described above; and a serial interface 430 similar to the serial interface 121 (FIG. 3) described above.

If the first controller IC 418 or the second controller IC 420 do not have enough internal static digital to analog, or analog to digital, converters, then external converters may be provided. In one embodiment, outputs may be implemented using Pulse Width Modulation (PWM), which is a powerful technique for controlling analog circuits with a processor's digital outputs.

Returning to FIG. 4, the first controller IC 418 preferably includes a number of input ports 124 (FIG. 3). These input ports are preferably electrically coupled to the APD power supply 410, post amplifier 412, and laser driver 414. Input signals received at these input ports include: a photodiode monitor signal (PD monitor) from the APD power supply; a loss of received power (RxLOS) signal from the post amplifier 412; and a DC bias monitor signal (DS Bias) and laser diode monitor signal (LD Monitor) from the laser driver. The photodiode monitor signal (PD monitor) is an indication of the received power. The loss of received power (RxLOS) signal is an indication that the optoelectronic receiver is not receiving an incoming optical signal or is not functioning. The DC bias monitor signal (DC Bias) is an indication of DC bias power being supplied to the optoelectronic transceiver. The laser diode monitor signal (LD Monitor) is an indication of the optoelectronic transmitter power being detected by the output power monitor 403.

The first controller IC 418 also preferably includes a number of output ports 123 (FIG. 3). The output ports are preferably electrically coupled to the APD power supply 410 and the laser driver 414. Output signals supplied from these output ports preferably include an APD control signal (APD Control) supplied to the APD power supply 410 and a DC bias control signal (DC Bias Control) supplied to the laser driver 414. The APD control signal (APD Control) is used to control the APD power supply and hence the voltage supplied to the APD 406, while the DC bias control signal (DC Bias Control) is used to control the laser driver 414 and hence the DC bias current supplied to the optoelectronic transmitter.

The second controller IC's input ports 504 (FIG. 5) are electrically coupled to the APD power supply 410, the laser driver 414, and the TEC 408. Input signals received at these input ports include: a photodiode monitor signal (PD monitor) from the APD power supply; a DC bias monitor signal (DS Bias) and laser diode monitor signal (LD Monitor) from the laser driver; and a TEC temperature (TEC Temp.) from the TEC. The photodiode monitor signal (PD monitor) is an indication of the received power. The DC bias monitor signal (DC Bias) is an indication of the DC bias current being supplied to the optoelectronic transceiver. The laser diode monitor signal (LD Monitor) is an indication of the optoelectronic transmitter power being detected by the output power monitor 403. The TEC temperature (TEC Temp.) is an indication of the temperature of the TEC.

The second controller IC's output ports 506 (FIG. 5) are preferably electrically coupled to the laser driver 414 and the TEC driver 416. Output signals supplied from these output ports preferably include an AC control signal (AC Control) supplied to the laser driver 414, and a TEC control signal (TEC Control) supplied to the TEC driver 416. The AC control signal (AC Control) is used to control the laser driver to supply modulated AC current to the optoelectronic transmitter. The TEC control signal (TEC Control) is used to control the TEC driver 416 and hence the TEC 408 itself. The CPU 502 of the second controller IC executes control software so as to control the TEC 408, so as to maintain a specified or target temperature in the TOSA 404. The control software executed by the CPU 502 may implement a conventional PID control loop for controlling the TEC 408, using the TEC temperature feedback signal as a control feedback signal.

Because in one embodiment the second controller IC 420 does not include enough internal analog to digital, and digital to analog converters, an analog to digital converter (ADC) 422 and a digital to analog converter (DAC) 424 are preferably supplied external to the second controller IC 420. The ADC 422 converts the DC bias monitor signals (DC Bias Monitor) and photodiode monitor signals (PD Monitor) from analog signals to digital signals before these signals enter the second controller IC 420. Similarly, the DAC 424 converts the digital AC control signal to an analog equivalent before the signal reaches the laser driver 414. In alternative embodiment, some or all of the analog to digital and digital to analog conversion functions are performed internally, within the second controller IC 420.

Unlike the first controller IC 418 that includes its own internal temperature sensor 125 (FIG. 3), the second controller IC 420 preferably obtains the temperature of the optoelectronic transceiver 400 from an external thermistor 426. In an alternative, the second controller IC 420 includes an internal temperature sensor.

In use, the second controller IC 420 controls the TEC driver supplied to the TOSA 404 as follows. The temperature from the thermistor 426 is read by an ADC channel in the second controller IC 420. The CPU 502 (FIG. 5) in the second controller IC 420 then computes a TEC drive command with a digital servo implemented in software and outputs a TEC control signal (TEC Control) using pulse width modulation, which acts as a kind of DAC. The TEC driver 416 accepts this TEC control signal as a voltage and drives the TEC accordingly. In one embodiment, the digital servo that controls the laser temperature uses a command value, servo gain settings, and limit settings stored in the non-volatile memory 500 (FIG. 5) to produce the TEC control signal.

Data received from the inputs in the first and second controller ICs are preferably stored in a diagnostic value and flag storage memory 128 (FIG. 3), and 508 (FIG. 5), respectively. In a preferred embodiment, the first controller IC 418 stores values for power supply voltage (Vcc), internal temperature, DC bias current/power, transmitted current/power, received current/power, etc. Similarly, in a preferred embodiment, the second controller IC 418 stores values for power supply voltage (Vcc), temperature measured by the thermistor 426, DC bias current/power, transmitted current/power, TEC temperature/load, etc. Accordingly, some of the same diagnostic data is stored on both the first and second controller ICs. This redundancy has many benefits, as will be described below.

The first and second controller ICs are also preferably coupled to a power supply via a supply voltage Vcc. Furthermore, the first and second controller ICs 418 and 420 each include a respective interface 428 and 430 to communicate with a remote host (not shown). The interface 428 is similar to the interface 121 (FIG. 3) described above. This interface is preferably a serial interface, such as an I2C (Inter IC), 2Wire, or MDIO bus. An I2C bus is a bi-directional two wire serial bus that provides a communication link between integrated circuits. An MDIO bus is a Management Data Input/Output bus, as described by the IEEE 802.3 specification. Alternatively, any other suitable serial interface could be used equally well.

In addition, the first and second controller ICs preferably have different serial device addresses, indicated by A0 and A2 in a preferred embodiment. In this way, a host can access each of these controller ICs separately and independently. Memory mapped locations within each controller are mapped to an address formed by concatenating a device address, specifying the controller, and a sub-device address, specifying a memory mapped location within one of the controllers. Host devices are typically preconfigured to read particular memory mapped locations for particular diagnostic data. However, different hosts may be preconfigured to read different memory mapped locations for the same diagnostic data. The inclusion of two controller ICs, however, allows the same diagnostic data to be stored in completely different memory mapped locations. This allows hosts that are preconfigured differently to read different memory mapped locations on the different controller ICs to obtain the same diagnostic data. In one embodiment, the memory mapped locations on the two controller ICs emulate two different host configurations, having different memory maps for each of the two controller ICs. In another embodiment, the two controller ICs have different device addresses, but identical memory maps (for host accessible locations) within the two controller ICs.

In yet another embodiment, the interfaces 428 and 430 in the first and second controller ICs, respectively, may communicate using different communication protocols. This allows the same optoelectronic transceiver to be used with hosts that communicate using different protocols. For example, in a first system configuration a first host may access diagnostic information on the first controller IC 418 using a first communication protocol, while in a second system configuration, a second host may access the same diagnostic information on the second controller IC 420 using a second communication protocol. This allows the same optoelectronic transceiver to be used in both systems without any redesign or reconfiguration of the communication protocols used by the optoelectronic transceiver.

While the combination of all of the above functions is desired in the preferred embodiment of this transceiver controller, it should be obvious to one skilled in the art that a device which only implements a subset of these functions would also be of great use. Similarly, the present invention is also applicable to transmitters and receivers, and thus is not solely applicable to transceivers. It should be pointed out that the controller of the present invention is suitable for application of multichannel optical links. It should also be appreciated that although two controller ICs are described herein, any number of controller ICs greater than one could be used to provide the functionality described above. Finally, the use of the term controller IC is not intended to limit the controller IC to performing control functions.

TABLE 1

MEMORY MAP FOR TRANSCEIVER CONTROLLER

| Memory Location (Array 0) | Name of Location | Function |
|---|---|---|
| 00h–5Fh | IEEE Data | This memory block is used to store required GBIC data |
| 60h | Temperature MSB | This byte contains the MSB of the 15-bit 2's complement temperature output from the temperature sensor. |
| 61h | Temperature LSB | This byte contains the LSB of the 15-bit 2's complement temperature output from the temperature sensor. (LSB is 0b). |

TABLE 1-continued

MEMORY MAP FOR TRANSCEIVER CONTROLLER

| | | |
|---|---|---|
| 62h–63h | $V_{cc}$ Value | These bytes contain the MSB (62h) and the LSB (63h) of the measured $V_{cc}$ (15-bit number, with a 0b LSbit) |
| 64h–65h | $B_{in}$ Value | These bytes contain the MSB (64h) and the LSB (65h) of the measured $B_{in}$ (15-bit number, with a 0b LSbit) |
| 66h–67h | $P_{in}$ Value | These bytes contain the MSB (66h) and the LSB (67h) of the measured $P_{in}$ (15-bit number, with a 0b LSbit) |
| 68h–69h | $R_{in}$ Value | These bytes contain the MSB (68h) and the LSB (69h) of the measured $R_{in}$ (15-bit number, with a 0b LSbit) |
| 6Ah–6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, $V_{cc}$, $B_{in}$, $P_{in}$ and $R_{in}$. The user writes the byte to 00h. Once a conversion is complete for a give value, its bit will change to '1'. |
| 70h–73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h–77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h–7Ah | Reserved | Reserved |
| 7Bh–7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0 × h (Array × Selected) Where x = 1, 2, 3, 4 or 5 |
| 80h–F7h | | Customer EEPROM |
| 87h | DA % Adj | Scale output of D/A converters by specified percentage |

| Memory Location (Array 1) | Name of Location | Function of Location |
|---|---|---|
| 00h–FFh | | Data EEPROM |

| Memory Location (Array 2) | Name of Location | Function of Location |
|---|---|---|
| 00h–Ffh | | Data EEPROM |

| Memory Location (Array 3) | Name of Location | Function of Location |
|---|---|---|
| 80h–81h 88h–89h 90h–91h 98h–99h A0h–A1h | Temperature High Alarm $V_{cc}$ High Alarm $B_{in}$ High Alarm $P_{in}$ High Alarm $R_{in}$ High Alarm | The value written to this location serves as the high alarm limit. Data format is the same as the corresponding value (temperature, $V_{cc}$, $B_{in}$, $P_{in}$, $R_{in}$). |
| 82h–83h 8Ah–8Bh 92h–93h 9Ah–9Bh A2h–A3h | Temperature Low Alarm $V_{cc}$ Low Alarm $B_{in}$ Low Alarm $P_{in}$ Low Alarm $R_1$ Low Alarm | The value written to this location serves as the low alarm limit. Data format is the same as the corresponding value (temperature, $V_{cc}$, $B_{in}$, $P_{in}$, $R_{in}$). |
| 84h–85h 8Ch–8Dh 94h–95h 9Ch–9Dh A4h–A5h | Temp High Warning $V_{cc}$ High Warning $B_{in}$ High Warning $P_{in}$ High Warning $R_{in}$ High Warning | The value written to this location serves as the high warning limit. Data format is the same as the corresponding value (temperature, $V_{cc}$, $B_{in}$, $P_{in}$, $R_{in}$). |
| 86h–87h 8Eh–8Fh 96h–97h 9Eh–9Fh A6h–A7h | Temperature Low Warning $V_{cc}$ Low Warning $B_{in}$ Low Warning $P_{in}$ Low Warning $R_{in}$ Low Warning | The value written to this location serves as the low warning limit. Data format is the same as the corresponding value (temperature, $V_{cc}$, $B_{in}$, $P_{in}$, $R_{in}$). |
| A8h–AFh, C5h B0h–B7h, C6h B8h–BFh, C7h | $D_{out}$ control 0–8 $F_{out}$ control 0–8 $L_{out}$ control 0–8 | Individual bit locations are defined in Table 4. |
| C0h | Reserved | Reserved |
| C1h | Prescale | Selects MCLK divisor for X-delay CLKS. |
| C2h | $D_{out}$ Delay | Selects number of prescale clocks |
| C3h | $F_{out}$ Delay | |
| C4h | $L_{out}$ Delay | |
| C8h–C9h | $V_{cc}$ - A/D Scale | 16 bits of gain adjustment for corresponding A/D conversion values. |
| CAh–CBh | $B_{in}$ - A/D Scale | |
| CCh–CDh | $P_{in}$ - A/D Scale | |
| CEh–CFh | $R_{in}$ - A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h–D6h | PW1 Byte 3 (D3h) MSB PW1 Byte 2 (D4h) PW1 Byte 1 (D5h) PW1 Byte 0 (D6h) LSB | The four bytes are used for password 1 entry. The entered password will determine the Finisar customer's read/write privileges. |
| D7h | D/A Control | This byte determines if the D/A outputs source or sink current, and it allows for the outputs to be scaled. |
| D8h–DFh | $B_{in}$ Fast Trip | These bytes define the fast trip comparison over temperature. |
| E0h–E3h | $P_{in}$ Fast Trip | These bytes define the fast trip comparison over temperature. |
| E4h–E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh–EBh | Internal State Bytes | Location of the bits is defined in Table 4 |
| ECh | I/O States 1 | Location of the bits is defined in Table 4 |
| EDh–EEh | D/A Out | Magnitude of the temperature compensated D/A outputs |

TABLE 1-continued

MEMORY MAP FOR TRANSCEIVER CONTROLLER

| | | |
|---|---|---|
| EFh | Temperature Index | Address pointer to the look-up Arrays |
| F0h–FFh | Reserved | Reserved |

| Memory Location (Array 4) | Name of Location | Function of Location |
|---|---|---|
| 00h–Ffh | | D/A Current vs. Temp #1 (User-Defined Look-up Array #1) |

| Memory Location (Array 5) | Name of Location | Function of Location |
|---|---|---|
| 00h–Ffh | | D/A Current vs. Temp #2 (User-Defined Look-up Array #2) |

TABLE 2

DETAIL MEMORY DESCRIPTIONS - A/D VALUES AND STATUS BITS

| Byte | Bit | Name | Description |
|---|---|---|---|
| Converted analog values. Calibrated 16 bit data. (See Notes 1–2) | | | |
| 96 (60h) | All | Temperature MSB | Signed 2's complement integer temperature (−40 to +125 C.) Based on internal temperature measurement |
| 97 | All | Temperature LSB | Fractional part of temperature (count/256) |
| 98 | All | $V_{cc}$ MSB | Internally measured supply voltage in transceiver. Actual voltage is full 16 bit value * 100 u Volt. |
| 99 | All | $V_{cc}$ LSB | (Yields range of 0–6.55 V) |
| 100 | All | TX Bias MSB | Measured TX Bias Current in mA Bias current is full 16 bit value *(1/256) mA. |
| 101 | All | TX Bias LSB | (Full range of 0–256 mA possible with 4 uA resolution) |
| 102 | All | TX Power MSB | Measured TX output power in mW. Output is full 16 bit value *(1/2048) mW. (see note 5) |
| 103 | All | TX Power LSB | (Full range of 0–32 mW possible with 0.5 μW resolution, or −33 to +15 dBm) |
| 104 | All | RX Power MSB | Measured RX input power in mW RX power is full 16 bit value *(1/16384) mW. (see note 6) |
| 105 | All | RX Power LSB | (Full range of 0–4 mW possible with 0.06 μW resolution, or −42 to +6 dBm) |
| 106 | All | Reserved MSB | Reserved for 1st future definition of digitized analog input |
| 107 | All | Reserved LSB | Reserved for 1st future definition of digitized analog input |
| 108 | All | Reserved MSB | Reserved for 2nd future definition of digitized analog input |
| 109 | All | Reserved LSB | Reserved for 2nd future definition of digitized analog input |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | $V_{cc}$ A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

DETAIL MEMORY DESCRIPTIONS - ALARM AND WARNING FLAG BITS
Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | $V_{cc}$ High Alarm | Set when internal supply voltage exceeds high alarm level. |
| 112 | 4 | $V_{cc}$ Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5-0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | $V_{cc}$ High Warning | Set when internal supply voltage exceeds high warning level. |
| 116 | 4 | $V_{cc}$ Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |

TABLE 3-continued

DETAIL MEMORY DESCRIPTIONS -
ALARM AND WARNING FLAG BITS
Alarm and Warning Flag Bits

| Byte | Bit | Name | Description |
|---|---|---|---|
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |
| X-out cntl7 | D-in clr | F-in inv clr | F-in clr | L-in inv clr | L-in clr | Aux inv clr | Aux clr | EE |
| X-out cntl8 | latch select | invert | o-ride data | o-ride select | S reset data | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | B | 3 B2 | $B^1$ | $B^0$ |
| chip address | $b^7$ | $b^6$ | $b^5$ | $b^4$ | b | 3 b2 | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |
| D/A cntl | source/sink 1/0 | D/A #2 range $2^2$ | $2^1$ | $2^0$ | source/sink 1/0 | D/A #1 range $2^2$ | $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale 2 | Pos_Scale 1 | Pos_Scale 0 |
| Margin #2 | Reserved | Neg_Scale2 | Neg_Scale1 | Neg_Scale0 | Reserved | Pos_Scale 2 | Pos_Scale 1 | Pos_Scale 0 |

What is claimed is:

1. An optoelectronic transceiver, comprising:

a first controller integrated circuit (IC) and a second controller IC, each comprising:

logic;

a memory configured to store digital diagnostic data corresponding to operating conditions of the optoelectronic transceiver, including data selected from a group consisting of: a loss of received power (Rx-LOS) signal, a photodiode monitor signal, a power supply voltage (Vcc), an internal temperature, a direct current (DC) bias current, a DC bias power, a transmitter current, a transmitter power, a receiver current, a receiver power, a Thermoelectric Cooler (TEC) temperature, and a TEC load, where at least some of said digital diagnostic data is common to both said first controller IC and said second controller IC;

an interface electrically coupled to said memory and configured for communicating said diagnostic data to a host external to said optoelectronic transceiver; and at least one input port electrically coupled to said memory and configured to receive said diagnostic data from other components within said optoelectronic transceiver, including components selected from a group consisting of: a Transmitter Optical Subassembly (TOSA), a Receiver Optical Subassembly (ROSA), a laser driver IC, a post amplifier IC, an Avalanche Photodiode (APD) power supply, a Thermoelectric Cooler (TEC) driver IC, and a power controller IC.

2. The optoelectronic transceiver of claim 1, wherein said interface is a serial interface.

3. The optoelectronic transceiver of claim 2, wherein said serial interface is selected from a group consisting of an I2C serial interface, a 2Wire serial interface, and an MDIO serial interface.

4. The optoelectronic transceiver of claim 1, wherein said interface is configured to enable said host to read from host-specified memory mapped locations within said memory.

5. The optoelectronic transceiver of claim 1, further comprising additional components selected from a group consisting of: a Transmitter Optical Subassembly (TOSA), a Receiver Optical Subassembly (ROSA), a laser driver, a post amplifier, an Avalanche Photodiode (APD) power supply, a Thermoelectric Cooler (TEC) driver, a power controller, a pre-amplifier, a laser wavelength controller, an analog-to-digital converter, a digital-to analog converter, or any combination of the aforementioned components.

6. The optoelectronic transceiver of claim 1, wherein said diagnostic data is stored in different memory mapped locations in said first controller IC and in said second controller IC.

7. The optoelectronic transceiver of claim 1, wherein said at least one output port of said first controller IC is electrically coupled to: an Avalanche Photodiode (APD) power supply to supply an APD control signal; and a laser driver IC to supply a direct current (DC) bias control signal.

8. The optoelectronic transceiver of claim 1, wherein said at least one output port of said second controller IC is electrically coupled to: a laser driver IC to provide an alternating current (AC) control signal; and a Thermoelectric Cooler (TEC) driver IC to supply a TEC control signal.

9. The optoelectronic transceiver of claim 8, wherein said second controller IC provides said AC control signal to said laser driver IC via a digital to analog converter.

10. The optoelectronic transceiver of claim 1, wherein said first controller IC further comprises at least one input port electrically coupled to: an Avalanche Photodiode (APD) power supply to receive a photodiode monitor signal; a post amplifier IC to receive a loss of received power (RxLOS) signal; and a laser driver IC to receive a direct current (DC) bias monitor signal and a laser diode monitor signal.

11. The optoelectronic transceiver of claim 1, wherein said second controller IC further comprises at least one input port electrically coupled to: an Avalanche Photodiode (APD) power supply to receive a photodiode monitor signal; a laser driver IC to receive a direct current (DC) bias monitor signal and a laser diode monitor signal; and a Thermoelectric Cooler (TEC) driver IC to receive a TEC temperature signal.

12. The optoelectronic transceiver of claim 1, wherein said second controller IC is electrically coupled to a thermistor disposed within said optoelectronic transceiver.

13. The optoelectronic transceiver of claim 1, wherein said first and second controller ICs are electrically coupled to a power source.

14. The optoelectronic transceiver of claim 1, wherein said first controller IC is configured to control direct current (DC) bias current supplied to a Transmitter Optical Subassembly (TOSA).

15. The optoelectronic transceiver of claim 1, wherein said first controller IC is configured to control Avalanche Photodiode (APD) power supplied to a Receiver Optical Subassembly (ROSA).

16. The optoelectronic transceiver of claim 1, wherein said second controller IC is configured to control alternating current (AC) current supplied to a Transmitter Optical Subassembly (TOSA).

17. The optoelectronic transceiver of claim 1, wherein said second controller IC is configured control a Thermoelectric Cooler (TEC) in a Transmitter Optical Subassembly (TOSA).

18. The optoelectronic transceiver of claim 1, wherein the logic of said first controller IC includes a plurality of state machines and the logic of said second controller IC includes a processor that executes stored programs.

19. An optoelectronic transceiver, comprising:
a first controller integrated circuit (IC) and a second controller IC, each comprising:
logic;
a memory configured to store digital diagnostic data, where at least some of said digital diagnostic data is common to both said first controller IC and said second controller IC;
an interface electrically coupled to said memory and configured for communicating said diagnostic data to a host external to said optoelectronic transceiver; and
at least one input port electrically coupled to said memory and configured to receive said diagnostic data from other components within said optoelectronic transceiver,
wherein said first controller IC further comprises at least one input port electrically coupled to: an Avalanche Photodiode (APD) power supply to receive a photodiode monitor signal; a post amplifier IC to receive a loss of received power (RxLOS) signal; and a laser driver IC to receive a direct current (DC) bias monitor signal and a laser diode monitor signal,
and wherein said second controller IC receives said photodiode monitor signal and said DC bias monitor signal via an analog to digital converter.

* * * * *

UNITED STATES PATENT AND TRADEMARK OFFICE
CERTIFICATE OF CORRECTION

| | | |
|---|---|---|
| PATENT NO. | : 7,149,430 B2 | Page 1 of 1 |
| APPLICATION NO. | : 10/616362 | |
| DATED | : December 12, 2006 | |
| INVENTOR(S) | : Lucy G. Hosking, James Stewart and Anthony Ho | |

It is certified that error appears in the above-identified patent and that said Letters Patent is hereby corrected as shown below:

Title Page, Item [73] Assignee: Please correct name to read Finisar Corporation

Signed and Sealed this

Seventeenth Day of April, 2007

JON W. DUDAS
*Director of the United States Patent and Trademark Office*